(12) United States Patent
Kees

(10) Patent No.: US 6,955,332 B2
(45) Date of Patent: Oct. 18, 2005

(54) HINGED ARMATURE VALVE

(75) Inventor: Ulrich Kees, Homburg (DE)

(73) Assignee: Festo AG & Co., Esslingen (DE)

( * ) Notice: Subject to any disclaimer, the term of this patent is extended or adjusted under 35 U.S.C. 154(b) by 6 days.

(21) Appl. No.: 10/820,078

(22) Filed: Apr. 7, 2004

(65) Prior Publication Data
US 2004/0227116 A1   Nov. 18, 2004

(30) Foreign Application Priority Data
May 13, 2003  (EP)  ................................. 03010654

(51) Int. Cl.$^7$ ............................................. F16K 31/02
(52) U.S. Cl. ................................ 251/129.01; 251/298
(58) Field of Search ........................ 251/129.01, 298

(56) References Cited

U.S. PATENT DOCUMENTS

| | | | |
|---|---|---|---|
| 3,570,807 A | * | 3/1971 | Sturman et al. ....... 251/129.17 |
| 4,534,381 A | * | 8/1985 | Hozumi et al. ........ 251/129.03 |
| 4,574,841 A | | 3/1986 | Hugler |
| 4,848,727 A | * | 7/1989 | Nanbu et al. .......... 251/129.16 |
| 5,139,226 A | * | 8/1992 | Baldwin et al. ........ 251/129.2 |
| 5,259,415 A | * | 11/1993 | Hess et al. ............. 251/129.2 |
| 5,709,370 A | | 1/1998 | Kah, Jr. |
| 6,722,629 B1 | * | 4/2004 | Nakazawa ............. 251/129.17 |

FOREIGN PATENT DOCUMENTS

| | | |
|---|---|---|
| DE | 3346290 A1 | 7/1984 |
| DE | 19505233 A1 | 8/1996 |

* cited by examiner

Primary Examiner—John Bastianelli
(74) Attorney, Agent, or Firm—Hoffmann & Baron, LLP

(57) ABSTRACT

A hinged armature valve having a drive part and a control part affixed thereto, the drive part comprising an electromagnet unit, which is embedded in a drive part housing, fashioned of plastic material, molded in place during manufacture. The control part defines a control chamber in which a hinged armature is accommodated able to be pivoted for selectively opening and closing of two valve openings. The control part housing as well consists of plastic material, it being connected with the drive part housing in the joint region by a surrounding laser weldment in a gas-tight manner.

17 Claims, 4 Drawing Sheets

HINGED ARMATURE VALVE

BACKGROUND OF THE INVENTION

The invention relates to a hinged armature valve comprising a drive part having a drive part housing in which an electromagnet unit with an iron core and a coil is arranged, a control part secured on the drive part, said control part having a control part housing, in which a control chamber is formed covered over by the drive part on it, in which control chamber a hinged armature is located, which in alternate succession can open and close a first valve opening formed on the drive part and surrounded by a first valve seat and a second valve opening formed in the control part housing and surrounded by a second valve seat, and a receiving recess, surrounding the first valve opening, in the drive part, such recess containing a return spring biasing the hinged armature into a home position closing the second valve opening.

THE PRIOR ART

In the case of a hinged armature valve of this type disclosed in the German patent publication 3,346,290 C2 an electromagnet unit is inserted in a drive part housing from the end, it having a flange resting on its coil body resting against the outer face of the drive part. On the flange of the coil body a control part defining a control chamber is mounted, in whose control part housing a pivoting hinged armature is accommodated. The hinged armature may open or close two valve openings in alternate succession, of which one is formed on the flange of the coil body and of which the other is formed on the control part. A return spring seated in a recess in the coil body urges the hinged armature toward a home position closing the second valve opening provided on the control part housing. On the side opposite to the drive part of the control part a connection board is mounted, which possesses connection board ducts communicating with the valve openings and which simultaneously functions as a cover for closing the control chamber.

The known hinged armature valve is made up of a plurality of components and involves complex manufacture which is relatively expensive.

The German patent publication 19,505,233 C2 describes a hinged armature valve having a two-part housing. The two parts of the housing define a fluid chamber, in which a pivoting hinged armature is arranged. An electromagnet comprising an iron core and a coil is attached in one of the two housing parts. By way of a return spring arranged in a receiving recess in the one housing part the hinged armature is biased into the home position. The valve openings, able to be opened and closed in alternate succession are adjustable as regards their position in order to adjust alignment in relation to the pole faces of the iron core. It is in this manner that a small air gap may be set, which prevents adhesion of the hinged armature on the iron core.

SHORT SUMMARY OF THE INVENTION

One object of the invention is to design a hinged armature valve of the type initially mentioned which has few parts and may be simply and cheaply produced.

In order to achieve these and/or other objects appearing from the present specification, claims and drawings, in the present invention the electromagnet unit is completely received in the drive part housing, the drive part housing being in the form of a plastic part molded by injection molding on the electromagnet unit, the receiving recess and the first valve seat are direct components of the drive part housing and are produced during injection molding of the drive part housing, the component part housing, also designed as a plastic part, defines the control chamber together with the drive part and is so formed at the control chamber that it sets the position of the hinged armature in its longitudinal and transverse direction, and the two housings directly engage each other and in the joint region are connected together by a surrounding laser weld seam in a gas-tight fashion.

For the production of the drive part the electromagnet unit has accordingly plastic material injected around it, and simultaneously the necessary valve seat with the associated valve duct and the receiving recess for the return spring are molded. Accordingly there is no need for later separate assembly of the electromagnet unit in the drive part housing, and it is possible to do without machining the plastic part to have the first valve seat and the receiving recess. In order to form the control chamber the control part housing, also consisting of plastic material, is mounted on the drive part housing, the hinged armature being set in position by a suitable configuration of the control part housing both in the longitudinal and also in the transverse direction. Separate setting in position of the hinged armature is accordingly unnecessary. Since finally the gas-tight connection between the drive part housing and the control part housing is produced by a surrounding laser weldment in the joint region of the two housings, it is unnecessary to have separate sealing means and to employ otherwise complex and expensive attachment means. Generally, the hinged armature valve may be manufactured at a relatively low cost.

Further advantageous developments of the invention are defined in the claims.

In order to prevent adhesion of the hinged armature on the pole faces facing it of the iron core, the electromagnet unit is best covered with a film-like thin plastic layer of the drive part housing on the side facing the hinged armature, such layer being produced directly during the injection molding of the drive part housing.

The iron core is preferably E-like in configuration and preferably consists of a stack of pole laminations placed laterally adjacent to one another. With such an arrangement of the laminations there is a particularly high energy density with a correspondingly short times.

For the pivotal bearing of the hinged armature a bearing projection may be provided which is molded on the control part housing, and which extends from the side, opposite to the drive part, into the control chamber and has a knife edge terminal section fitting into a transverse groove in the hinged armature supported by the opposite side of the drive part housing.

For opening and closing the valve openings surrounded by a valve seat preferably a single closure member is provided on the hinged armature, such member being loosely plugged into an opening in the elongated ferromagnetic principal body of the hinged armature. When the closure member is seated to be able to be pivoted to a limited extent in the opening, its terminal faces, facing the valve seats, may align themselves on contact with the valve seats automatically so that there is a reliably sealing, planar sealing engagement.

In order to produce a hinged armature valve with a ³⁄₂ valve functionality in addition to the valve ducts leading to the first and second valve opening there is a non-controlled, third valve duct opening into the control chamber. All three valve ducts extend through the drive part housing and open at the outer face of the drive part housing, preferably at the base face, opposite to the control part, of the drive part housing, where a connection board can be mounted, which has connection board ducts communicating with the valve ducts.

The hinged armature valve may be provided with manual actuating means, which render possible manual operation without activating of the electromagnet unit. These manual actuating means have an actuating plunger, which extends (with the possibility of adjustment of the stroke) through the control part housing in the wall section delimiting the control chamber on the side opposite to the drive or control part. On manual operation of the actuating plunger a setting force may be exerted on the hinged armature to deflect same out of the home position.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

Figure 6:
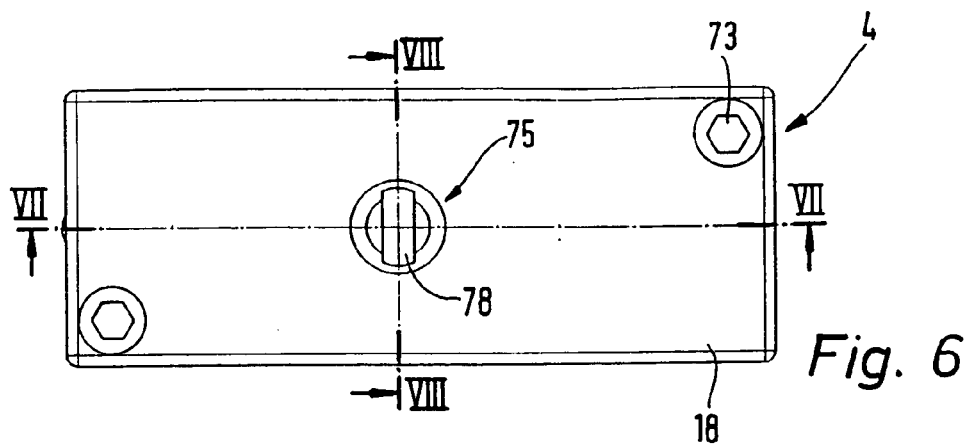
FIG. 6 shows a separate representation of a further modified embodiment having manual actuating means in plan looking in the direction of the arrow VI of FIG. 7.
Figure 7:
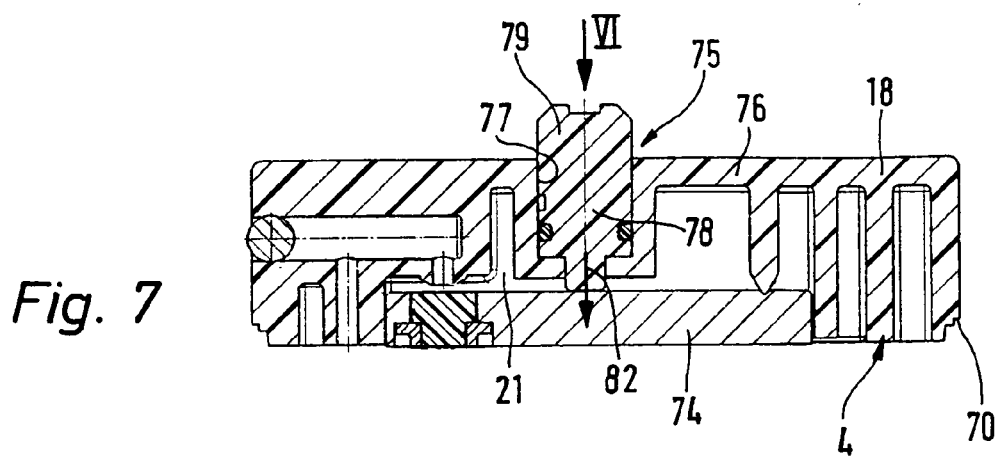
FIG. 7 shows the control part of FIG. 6 in a longitudinal view taken on the line VII—VII.
Figure 8:
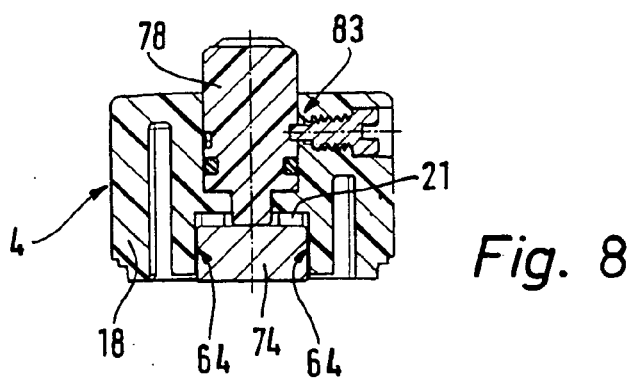

FIG. 8 the control part of FIGS. 6 and 7 in a cross section taken on the line VIII—VIII of FIG. 6.

DETAILED ACCOUNT OF WORKING EMBODIMENTS OF THE INVENTION

The hinged armature valve generally referenced 1 comprises a drive part 2 and a control part 4 mounted on the top side 3 of the drive part 2. At the bottom side 5, opposite to the top side 3, the drive part 2 is mounted on a connection board 6. The wording "top side" and "bottom side" relate to the preferred alignment (given by way of example) of the hinged armature valve 1, it however having to be borne in mind that the eventual alignment of the hinged armature valve 1 may be in any suitable direction.

The drive part 2 possesses a drive part housing 7 manufactured of synthetic resin, in which an electromagnet unit 8 is located. The latter is completely received in the drive part housing.

The electromagnet unit 8 possesses an iron core 11, which is preferably in the form of a letter E. The pole faces 12 of the iron core 11 are located at the top side 3 and face the control part 4. In the working embodiment three pole faces 12 are provided, which are constituted by the end faces of the three limbs 14, aligned in the height direction 13 of the hinged armature valve 1, of the E-like iron core 11. The limbs 14 and accordingly also the pole faces 12 are arranged in the longitudinal direction 15 of the hinged armature valve 1 in succession.

The electromagnet unit 8 comprises a coil 17 seated on the center limb 14 of the iron core 11. It is connected with electrical lead contacts 16, which extend through the drive part housing 7 and extend from it to render an electrical connection possible. Axially and on either side the coil 17 is preferably flanked by a plastic board 19 seated as well on the middle limb 14.

The drive part housing is a plastic part, which during its production is directly molded on the electromagnet unit 8 by injection. The electromagnet unit 8 is hence embedded in an interlocking manner right round in the drive part housing 7, all intermediate spaces being filled with the plastic material of the drive part housing 7. More particularly, the plastic material of the drive part housing 7 also extends in the intermediate spaces between the coil 17 and the iron core 11. Preferably, the drive part housing 7 consists of a thermoplastic material.

During molding the plastic around the electromagnet unit 8 the electrical contacts 16 are also embedded in the material of the drive part housing 7.

The control part 4 possesses a control part housing 18 also consisting of plastic material and preferably of thermoplastic material. It is manufactured separately from the drive part housing 7 and during assembly of the hinged armature valve 1 is mounted on the top side 3 on the drive part housing 7.

In the interior of the control part housing 10 a chamber is formed which is termed a control chamber 21. Such chamber is open toward the drive part 2 and in other respects completely is shut off by the control part housing 18. Accordingly the control chamber 21 is delimited, in the condition mounted on the drive part 2 of the control part 4 jointly by the drive part 2 and by the control part housing 18.

The control chamber 21 possesses an elongated configuration and extends in the longitudinal direction 15 of the hinged armature valve 1.

A first valve opening 22 and a second valve opening 23 open in the control chamber 21 at one of its end regions laterally. These two valve openings 22 and 23 are opposite each other in the height direction 13 of the hinged armature valve 1 and also face one another.

The first valve opening 22 is provided in the drive part housing 7 and is surrounded by a first valve seat 24, which is delimited by the plastic material of the drive part housing 7. The second valve opening 23 is located on the control part housing 18 and is surrounded by a second valve seat 25, which is delimited by the plastic material of the control part housing 18.

A third valve opening 26, not surrounded by a valve seat 21 is so arranged on the top side of the control part housing 18 that it is covered over by the control chamber 21 formed in the control part 4.

The first, second and third valve openings 22, 24 and 26 are the openings of a first, second and third valve ducts 27, 28 and 29. These three valve ducts 27, 28 and 29 respectively have at least a part of the their length extending through the drive part housing 7 and open at a first, second and, respectively, third connection opening 31, 32 and 33 at the outer face of the drive part housing 7. In the working embodiment the three connection openings 31, 32 and 33 lie jointly on the base face 34, located on the bottom side 5, of the drive part housing 7.

While the first and third valve ducts 27 and 29 extending from the first and third valve opening 22 and 26 have their full lengths extending in the drive part housing 7, the second valve duct 28 extending between the second valve opening 23 and the second connection opening 23, is divided in length into a first and a second duct section 35, the first duct section 35 extending in the control part housing 18 and the second duct section 36 extending in the drive part housing 7. These two duct sections 35 and 36 open at mutually facing duct openings 37 toward the joint region 38 of the two housings 7 and 18 and are consequently connected together for fluid transmission.

Since The first duct section 35 of the second valve duct 28 extends for some distance around the control chamber 21, it is preferably designed with two duct branches running together at a right angle, of which one is closed by a closure member 74 in a sealing manner. The closure member 74 is in the example a ball pressed into place or a plug welded in position.

All duct parts—in this case to wit the complete first and second valve ducts 27 and 29 and furthermore the second duct section 36 of the second valve duct 28—are directly produced during the injection molding of the drive part housing 7, that is to say during the molding of the plastic material constituting the drive part housing 7 around the electromagnet unit 8. It is in this manner that it is possible to do without any machining of the drive part housing.

On the base face 34 of the drive part housing 7 the connection board 6 is placed with a seal 39 in between. First, second and third connection board ducts 42, 43 and 44 extend in the board 6, which at one end open into the mounting area 45 carrying the drive part 2, of the connection board 6 where with the they communicate with the first, second and third coordinated connection openings 31, 32 and 33 with a suitable sealing connection in between. At the other end the connection board ducts 42, 43 and 44 lead to the outer face of the connection board 6, where if needed they may be provided with connection means 46, which render possible the detachable connection of fluid lines leading to other equipment.

In the case of the hinged armature valve 1 of the working example the first valve duct 27 constitutes a venting duct, which by way of the associated first connection board duct 42 opens into the atmosphere. It is therefore not fitted with connection means 46. However in the case of need a muffler, not illustrated, may be connected. Furthermore, naturally, suitable connection means 46 may be provided, if removal of spent air through a pipe is desired.

The second valve duct 28 is a supply duct in the working embodiment. During operation compressed air is supplied through it.

The third valve duct 29 finally is in the working example a power duct, with which a load to be driven such as a pneumatically operated drive, may be connected.

Although the hinged armature valve 1 is more especially suitable for compressed air operation, it may readily also be employed for the control of other gaseous media or furthermore for the control of hydraulic pressure media.

In the control chamber an elongated and more particularly beam-like hinged armature 47 is arranged. It possesses an elongated base body 48 having ferromagnetic properties, which at its front end region is provided with a closure member 51. The closure member 51 is seated between the first and the second valve seat 24 and 25, its length being less than the distance between the these two valve seats 24 and 25.

At its rear side the hinged armature 47 is pivotally mounted, the pivot axis extending in the width direction and at a right angle to the longitudinal direction 15 and to the height direction 13. The pivotal motion provided for by such measures of the hinged armature 47 is indicated at 52 by double arrow.

The ferromagnetic base body 48 extends over the pole faces 12 of the electromagnet unit 8. However, it does not at any time make direct contact with the iron core 11, because the electromagnet unit 8, on the side facing the hinged armature 47, is best covered by a film-like thin plastic layer 53. This plastic layer 53 is an integral component of the drive part housing 7 and is produced during injection molding of the drive part housing 7. Ultimately it also has an effect such that the electromagnet unit 8 is encapsulated in a sealing manner in the plastic material of the drive part housing 7.

Figure 3:
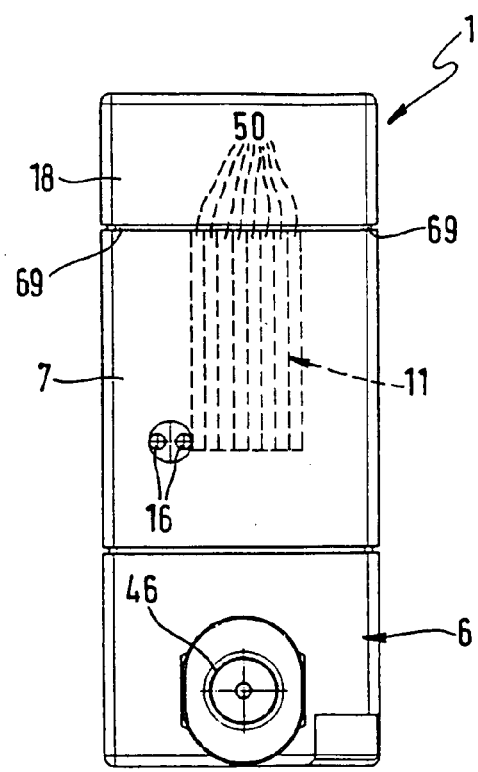
FIG. 3 is an end-on view of the hinged armature valve looking in the direction of the arrow III in FIG. 1.

As shown in FIG. 3 the iron core 11 is preferably in the form of a stack of pole laminations laterally placed together. This means that there is a particularly high energy density and compact dimensions.

In order to permit the pivotal movement of the hinged armature 47 in the working embodiment a bearing projection 54 is provided integral with the closure member 18, which extends from the side opposite to the drive part 2 into the control chamber 21 and has a terminal section 55, similar to a knife edge, fitting into a transverse groove 56, produced by embossing, in the base body 48, the hinged armature 47 being able to be supported on the opposite side on the drive part housing 7. The play as measured in the height direction 13 between the drive part housing 7 and the terminal section 55 in the form of a knife edge is so dimensioned that the hinged armature 47 has the necessary degree of freedom for pivoting.

The closure member 51 loosely plugged in place from the side facing the drive part 2 into an opening 52 vertically extending through the base body 48. The depth of fitting in is limited by a preferably ring-like abutment element 58 connected with the closure member 51 for example by pressing or by being made in one piece.

The closure member 51 preferably comprises material with rubber-like properties. It possesses two mutually opposite closing or valve faces 59 and 60 each facing one of the two valve seats 24 and 25.

The first valve opening 22 and the length section adjoining same of the first valve duct 27 are surrounded by an annular receiving recess 62, which together with the first valve seat 24 is produced directly during injection molding of the drive part housing 7.

In the receiving recess 62 a return spring 63 is seated, which in the working example is a helical compression spring and which bears against the floor of the receiving recess 62 and the hinged armature 47. It is so designed that it biases the hinged armature 47, when the electromagnet unit 8 is not energized, into a home position, in which the hinged armature 47 has its closure member 51 in engagement with the second valve seat 25 and hence closes the second valve opening 23 in a sealing fashion.

In this connection it is an advantage for the return spring 63, by means of the hinged armature 47, to act on the closure member 51 and in the working example to rest against the radial projection constituting the abutment element 58.

Figure 1:
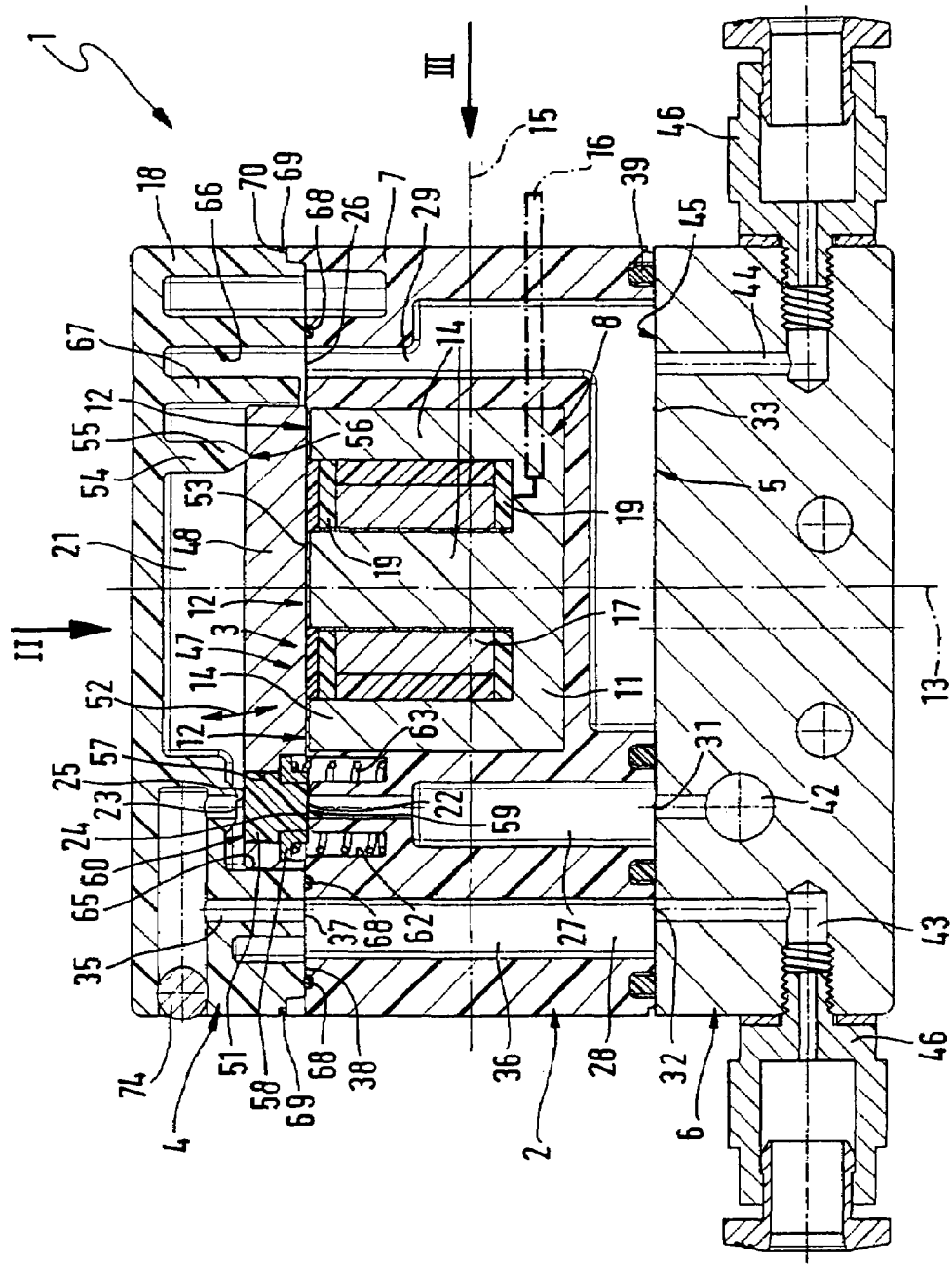
FIG. 1 shows a preferred embodiment of the hinged armature valve in accordance with the invention in a longitudinal section taken on the line I—I of FIG. 2.

If the electromagnet unit 8 is actuated by the application of a voltage to the connection contacts 16, the hinged armature 47 is pivoted against the force of the return spring 63 into the deflected position depicted in FIG. 1. In this deflected position the first valve opening 22, which is uncovered in the home position, is closed by the closure member 51 resting against the first valve seat 24 and simultaneously the second valve opening 23 is uncovered, since the closure member 51 is lifted from the second valve seat 25.

After the deactivation of the electromagnet unit 8 the hinged armature 47 will return to the home position owing to the spring force.

In connection with the third valve duct 29 constantly in communication with the control chamber 21 it is accordingly possible to produce a 3/2 valve function. For this in the home position the first and the third valve duct 27 and 29 and, in the deflected position, the second and the third valve duct 28 and 29 are connected together by way of the control chamber 21, whereas the respectively other second and, respectively, first valve duct 28 and 27 are closed.

In order to allow for manufacturing inaccuracies, the closure member 51 is so arranged in the opening 57 to be able to pivot to a limited extent on all sides that its valve faces 59 and 60 may be automatically aligned in relation to the respectively contacted valve seat 24 and 25. It is in this manner that in all cases a planar sealing engagement with optimum sealing properties may be ensured.

The control part housing 18 is so shaped at the control chamber 18 that it keeps the hinged armature 47 in position both in its longitudinal direction and also in the transverse direction. In the working embodiment the hinged armature 47 is fixed in position laterally with a small degree of play permitting pivotal movement between the side walls 64 of the control chamber 21. In the longitudinal direction there is the fixing action between the front end wall 65 of the control chamber 21 and an intermediate wall 67 extending into the control chamber 21 at a distance from the rear end wall 66, such intermediate wall 67 being an integral component of the closure control part housing 18.

In the joint region 38 between the control part housing 18 and the drive part housing 7 there is a preferably integral seal 68, which respectively separately surrounds on the one hand the control chamber 21 and on the other hand the region with the communicating duct openings 37 of the two duct sections 35 and 36. The seal 68 is indicated in chained lines in FIG. 2.

In the joint region 38 the control part housing 18 makes direct engagement with the drive part housing 7. For joining the parts together a peripheral laser weldment 69 is provided, by which the two housings 7 and 18 are attached together in the joint region 38 by the welding action and in a gas-tight manner.

Preferably the weld seam 69 produced by laser welding is seated in a join surrounding the joint region 38 about the two housings 7 and 18.

Owing to laser weld the drive part and the control part 4 constitute a permanently connected structural unit. For fixing the parts together no separate attachment means are necessary. It is merely for fixing the structural unit in the component mounting area 45 on the connection board 6 that suitable attachment means 73, as for example attachment screws are provided.

Figure 2:
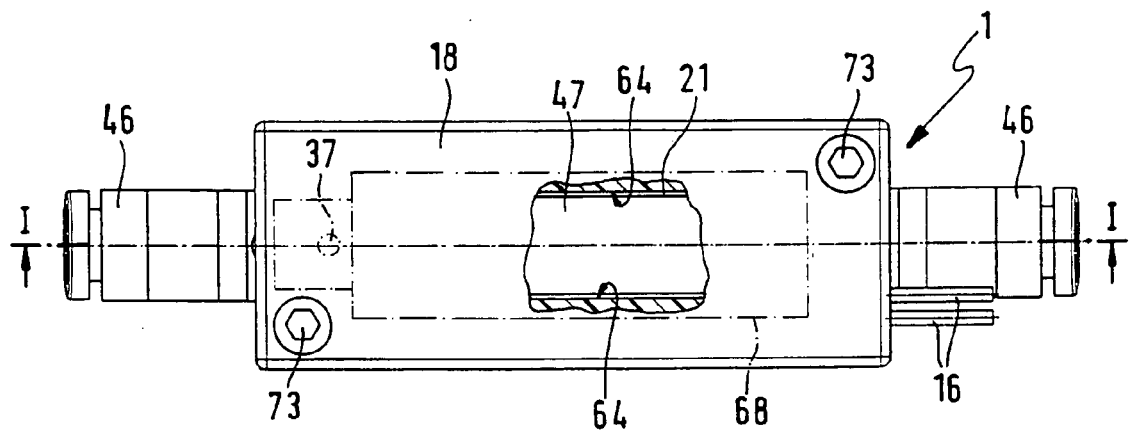
FIG. 2 shows the hinged armature valve of FIG. 1 in plan view looking in the direction of the arrow II.

While FIGS. 1 through 3 show a design of the hinged armature valve 1, which is exclusively designed for electrical operation, FIGS. 4 through 8 show possible modifications, which if necessary also permit manual auxiliary operation, for example for testing or servicing operations. For this purpose the hinged armature valve 1 is provided with suitable manual operating means 75.

The design of such manual operating means 25 entails having a hole 77 in the control part housing 18 in the top wall section 76 delimiting the control chamber 21 on the side opposite to the control part 2 so that an actuating plunger 78 may extend through such hole 77 in a sealing manner. On an actuating section 79, projecting from the control part housing 18, of the actuating plunger 78 a manually applied force may be employed so that the actuating plunger 78 is moved the arrowed direction toward the hinged armature 47 acting on it so that it is pivoted out of the previously assumed home position into the depicted, deflected position.

Figure 4:
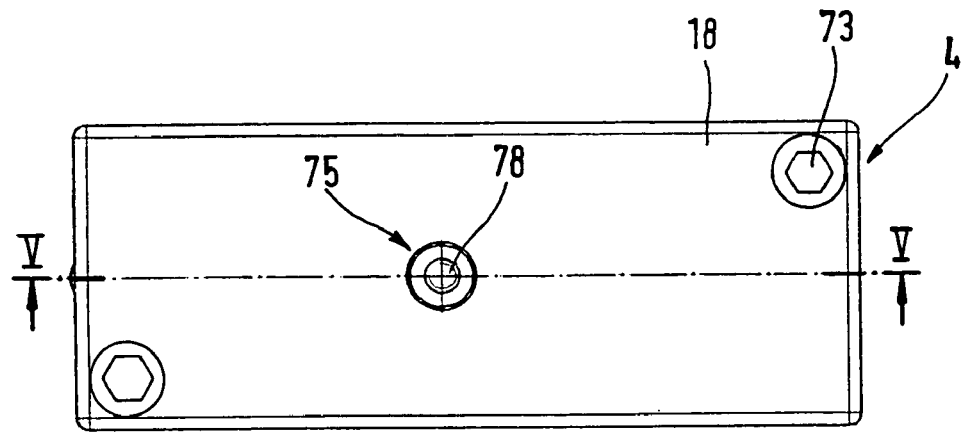
FIG. 4 is a separate plan view of a modification of the embodiment of the control part having manual operating means looking in the direction of the arrow IV of FIG. 5.
Figure 5:
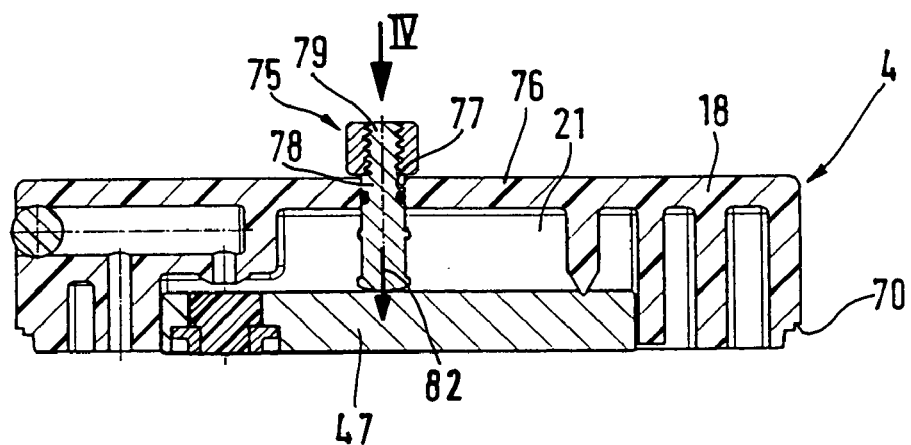
FIG. 5 is a longitudinal section taken through the control part on the line V—V of FIG. 4.

The actuating plunger 78 may, as is indicated in the case of the working example of FIGS. 4 and 5, be a sliding part only operated by axial sliding. In this case it is sufficient, for actuation, to exert a thrust force in the direction of the arrow 82, on the actuating section 79.

To the extent that holding in position by hand is desired, a sliding and rotating design of the actuating plunger 78 is appropriate, as is the case in the FIGS. 6 through 8. For activation in this case the actuating plunger 78 is turned on the actuating section 79 and from the rotary movement the desired axial movement is derived. The latter is for example produced by having a helical groove on the outer periphery of the actuating plunger 78 with a projection, attached to the housing, running in the groove as is illustrated at 83.

What is claimed is:

1. A hinged armature valve comprising a drive part having a drive part housing in which an electromagnet unit with an iron core and a coil is arranged, a control part secured on the drive part, said control part having a control part housing, in which a control chamber is formed covered over by the drive part on it, in which control chamber a hinged armature is located, which in alternate succession can open and close a first valve opening formed on the drive part and surrounded by a first valve seat and a second valve opening formed in the control part housing and surrounded by a second valve seat, and a receiving recess, surrounding the first valve opening, in the drive part, such recess containing a return spring biasing the hinged armature into a home position closing the second valve opening, wherein the electromagnet unit is completely received in the drive part housing, the drive part housing being in the form of a plastic part molded by injection molding on the electromagnet unit; the receiving recess and the first valve seat are direct components of the drive part housing and are produced during injection molding of the drive part housing; the component part housing, also designed as a plastic part, defines the control chamber together with the drive part and is so formed at the control chamber that it sets the position of the hinged armature in its longitudinal and transverse direction; and the two housings directly engage each other and in the joint region are connected together by a surrounding laser weld seam in a gas-tight fashion.

2. The hinged armature valve as set forth in claim 1, wherein on the side facing the hinged armature the electromagnet unit is covered over by a film-like thin plastic layer of the drive part housing and accordingly is accommodated in the drive part housing in a sealed capsule.

3. The hinged armature valve as set forth in claim 1, wherein the iron core has an E-like configuration and possesses three limbs respectively adjacent at one end to the hinged armature, the coil being seated on the middle limb.

4. The hinged armature valve as set forth in claim 3, wherein the iron core comprises a stack of laterally abutting pole laminations.

5. The hinged armature valve as set forth in claim 1, wherein for pivotally supporting the hinged armature a bearing projection is provided molded on the control part housing and extending from the side opposite to the drive part into the control chamber, such projection having an end section with a knife edge fitting into a transverse groove in the hinged armature bearing against the opposite side of the drive part.

6. The hinged armature valve as set forth in claim 1, wherein the hinged armature possesses a closure member arranged between the two valve seats.

7. The hinged armature valve as set forth in claim 6, wherein the closure member is loosely inserted into a hole in the elongated, ferromagnetic base body of the hinged armature.

8. The hinged armature valve as set forth in claim 7, wherein the closure member is inserted from the side, which faces the drive part, into the hole in the base body, a radial projection provided on the closure member limiting the depth of insertion and the return spring engaging the closure member with a thrust effect.

9. The hinged armature valve as set forth in claim 7, wherein the closure member is seated in the hole with a limitation of pivoting on all sides so that its valve faces facing the valve seats may automatically align themselves on contact as regards the respectively associated valve seat.

10. The hinged armature valve as set forth in claim 1, comprising a first valve duct extending from the first valve opening, a second valve duct extending from the second valve opening and a third valve duct valve opening provided on the drive part housing and also opening into the control chamber, all three valve ducts extending through the drive part housing and opening at a first, second and third connection opening at the outer face of the drive part housing, the duct regions extending in the drive part housing being produced directly during production of the drive part housing involving injection molding around the electromagnet unit.

11. The hinged armature valve as set forth in claim 10, wherein the first valve duct comprises a first duct extending in the control part housing and a second duct section extending in the drive part housing.

12. The hinged armature valve as set forth in claim 11, comprising a seal placed between the drive part housing and the control part housing, said seal surrounding on the one hand the control chamber and on the other hand the transition zone between the two duct sections.

13. The hinged armature valve as set forth in claim 10, wherein the first, second and third connection openings are provided on the base face opposite to the control part of the drive part housing.

14. The hinged armature valve as set forth in claim 13, comprising a connection board mounted on the base face of the drive part housing and having connection board ducts communicating with the valve ducts.

15. The hinged armature valve as set forth in claim 1, wherein the hinged armature is held axially in place between a front end wall of the control chamber and an intermediate wall extending into the control chamber at a distance from the rear end wall, of the control part housing.

16. The hinged armature valve as set forth in claim 1, wherein the control part housing has an opening in the wall section delimiting the control chamber on the side opposite to the drive part, an actuating plunger extending through the opening in a sealing manner, such plunger being adjustable in the stroke direction of the hinged armature, manual operation thereof leading to the hinged armature being deflected without activating the electromagnet unit out of its home position.

17. The hinged armature valve as set forth in claim 16, wherein the actuating plunger is designed in the form of a slide able to be actuated simply by axial sliding or in the form of a rotary and sliding part able to be actuated by a rotary movement.

* * * * *